No. 786,042. PATENTED MAR. 28, 1905.
V. LONCARIC.
DOUGH SHAPING MACHINE.
APPLICATION FILED MAY 11, 1904.
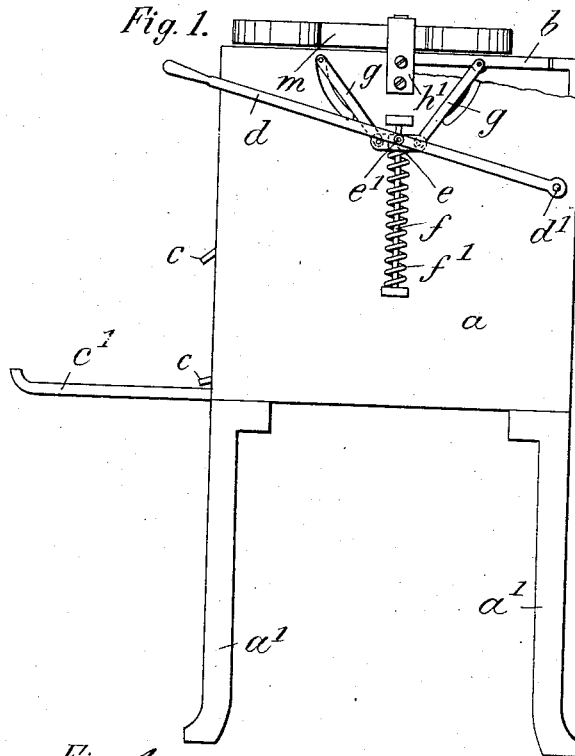
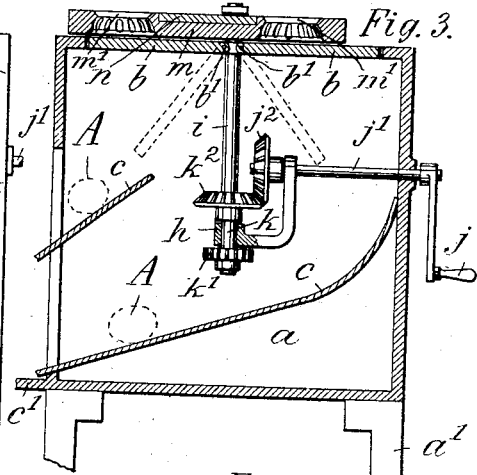
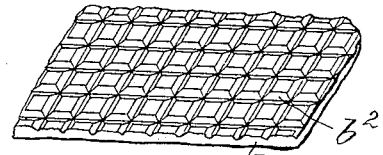
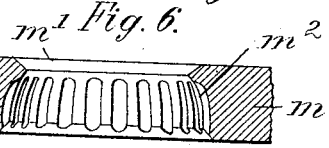
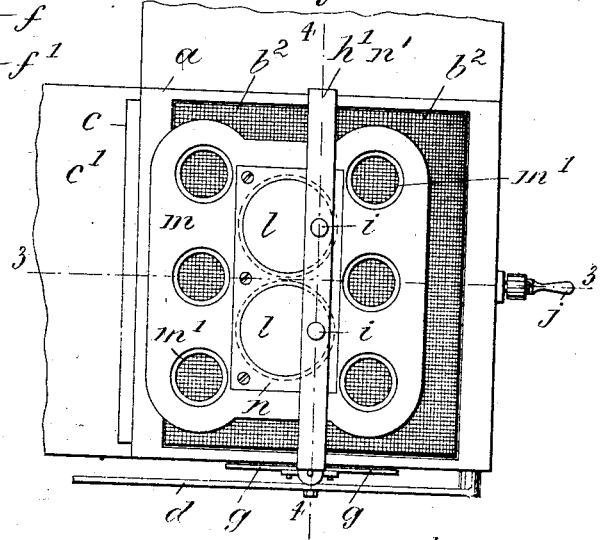
Witnesses:
Arthur Gumpe
Fred. Unfricht
Inventor:
Vingenz Loncaric
by Frank V. Briesen Att'y.

No. 786,042.

Patented March 28, 1905.

UNITED STATES PATENT OFFICE.

VINZENZ LONCARIC, OF NEW YORK, N. Y.

DOUGH-SHAPING MACHINE.

SPECIFICATION forming part of Letters Patent No. 786,042, dated March 28, 1905.

Application filed May 11, 1904. Serial No. 207,386.

*To all whom it may concern:*

Be it known that I, VINZENZ LONCARIC, a citizen of Austria-Hungary, residing at New York city, Manhattan, county and State of New York, have invented new and useful Improvements in Dough-Shaping Machines, of which the following is a specification.

This invention relates to a machine for rolling batches of dough into balls ready to be worked into rolls.

In the accompanying drawings, Figure 1 is a side elevation, partly broken away, of my improved dough-shaping machine; Fig. 2, a plan thereof; Fig. 3, a section on line 3 3, Fig. 2; Fig. 4, a section on line 4 4, Fig. 2; Fig. 5, a detail perspective view of portion of the hinged lid, and Fig. 6 a detail cross-section through part of the slide.

The letter $a$ represents a chamber supported upon legs $a'$. The open top of this chamber is provided with two lids $b$, hinged at $b'$, and provided with a ribbed or roughened surface $b^2$, Fig. 5. The lids $b$ may be raised into a horizontal position, Fig. 1, or they may be inclined downward, dotted lines, Fig. 3. Below the lids $b$ are arranged a pair of chutes $c$, that convey the balls of dough A to a receiving table or shelf $c'$. The lids $b$ are operated by a hand-lever $d$, fulcrumed to chamber $a$ at $d'$. To lever $d$ is pivoted at $e'$ a cross-head $e$, free to reciprocate along a vertical guide-rod $f$ and normally raised by a spring $f'$. Pivoted links $g$ connect the lids $b$ to the cross-head $e$. Thus when the lever $d$ is depressed the lids will be lowered, while when the lever is released the lids will be raised by the action of spring $f'$.

Parallel with the top of chamber $a$ and intermediate the lids $b$ extends a bridge $h'$, in which are hung a pair of shafts $i$, journaled in partition $h$. These shafts may be rotated simultaneously in the same direction by a handle $j$, fitted to the work-shaft $j''$. Shaft $j''$, by bevel-wheel $j^2$ $k^2$, rotates counter-shaft $k$, which in turn, by wheels $k'$ $i''$, is intergeared with shafts $i$. Upon each shaft $i$ is mounted an eccentric $l$, the eccentrics being received within corresponding recesses of a slide $m$. This slide is supported by the eccentrics above lids $b$, to which effect the eccentrics are provided with flanges $l'$, that fit corresponding recesses of the slide. In order to permit the proper assemblage of the parts, a detachable perforated plate $n$ is sunk into slide $m$ above eccentrics $l$. The slide $m$ has a number of perforations $m'$ with corrugated or fluted sides $m^2$, Fig. 6, and arranged above lids $b$, the drawings, Fig. 2, showing three perforations above each lid.

In use the batches of dough are transferred from a delivery table or shelf $n'$ to the openings $m'$, so as to rest upon lids $b$. By now turning handle $j$ a cyclic movement will be imparted to the slide $m$—i. e., each point of the slide will describe a circle. By this movement the batches of dough will be quickly rolled between the fluted sides $m^2$ of openings $m'$, and the roughened lids $b$ into a spherical shape. After the operation is completed the lever $d$ is depressed to lower lids $b$ and cause the finished balls A to descend along said lids and the chutes $c$ to the receiving-table $c'$.

What I claim is—

1. The combination in a dough-shaping machine of a perforated slide having a pair of recesses, with a pair of eccentrics engaging the same, means for simultaneously rotating the eccentrics, a hinged lid below the slide, and a chute below the lid, substantially as specified.

2. The combination in a dough-shaping machine of a perforated slide having a pair of recesses, with a pair of eccentrics engaging the same, means for simultaneously rotating the eccentrics, a hinged lid below the slide, a spring-influenced cross-head operatively connected to the lid, a guide-rod, and a lever for operating the cross-head, substantially as specified.

Signed by me at New York city, Manhattan, New York, this 10th day of May, 1904.

VINZENZ LONCARIC.

Witnesses:
WILLIAM SCHULZ,
FRANK V. BRIESEN.